United States Patent [19]

Doby

[11] 4,063,661

[45] Dec. 20, 1977

[54] ELECTRIC LOAD RESEARCH DEVICE INCLUDING AN ENCLOSURE HAVING ADJUSTABLE METER POSITIONS

[75] Inventor: William P. Doby, Raleigh, N.C.

[73] Assignee: Westinghouse Electric Corporation, Pittsburgh, Pa.

[21] Appl. No.: 680,659

[22] Filed: Apr. 27, 1976

Related U.S. Application Data

[63] Continuation of Ser. No. 550,700, Feb. 18, 1975, abandoned.

[51] Int. Cl.² ............... H02B 9/00; B65D 41/06; B65D 41/36
[52] U.S. Cl. ............................ 220/293; 174/50; 248/27.1; 324/156; 361/370
[58] Field of Search ............ 220/293; 248/27 R; 317/104–111; 324/156, 157, 153, 113; 174/50, 52 R

[56] References Cited

U.S. PATENT DOCUMENTS

| | | | |
|---|---|---|---|
| 1,724,520 | 8/1929 | Schlaich | 248/27 X |
| 1,735,904 | 11/1929 | Keeney | 248/27 X |
| 2,145,546 | 1/1939 | Kingdon | 317/107 X |
| 2,249,075 | 7/1941 | Young et al. | 317/107 X |
| 3,067,362 | 12/1962 | Patton | 324/156 X |
| 3,628,096 | 12/1971 | Drew, Jr. | 220/293 X |
| 3,714,516 | 1/1973 | Howe | 317/106 X |
| 3,751,791 | 8/1973 | Horwitz et al. | 317/104 X |

*Primary Examiner*—George T. Hall
*Attorney, Agent, or Firm*—R. W. Smith

[57] ABSTRACT

An electric load research device includes an enclosure having a pulse data recorder and an adjustable meter mounting arrangement for attaching an impulse sending electric meter. The meter is attachable in different rotated positions within the research device enclosure for connecting the device at a utility customer's meter socket in different orientations to avoid adjacent obstructions.

4 Claims, 8 Drawing Figures

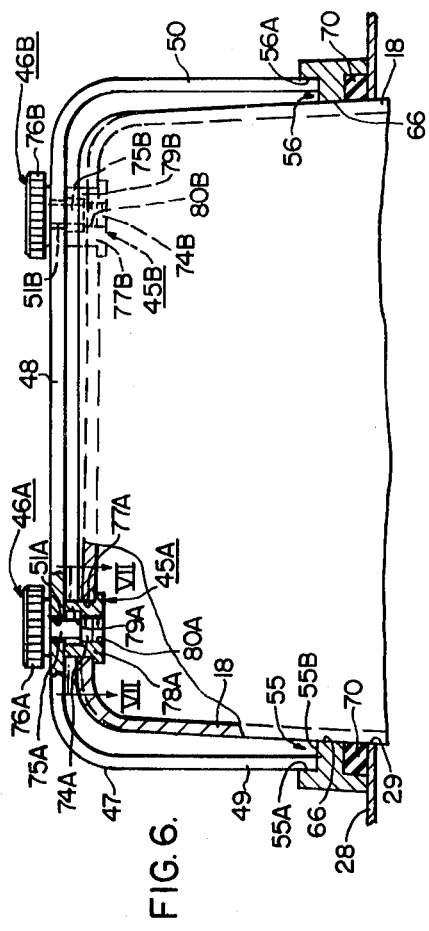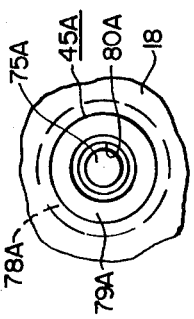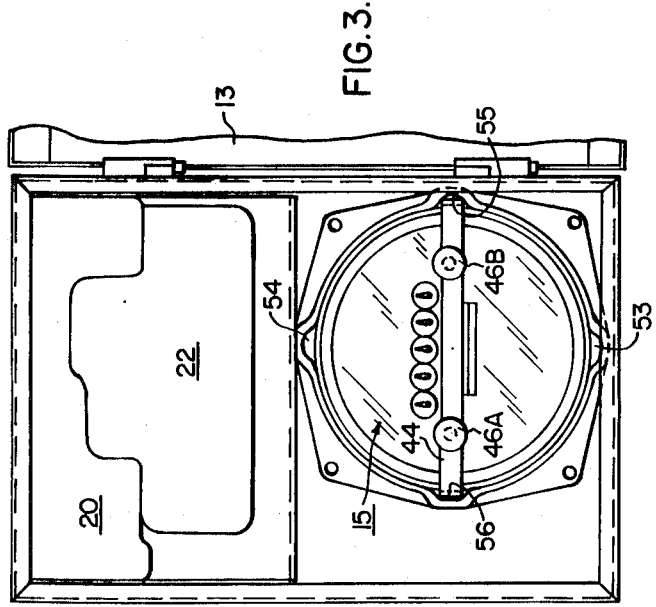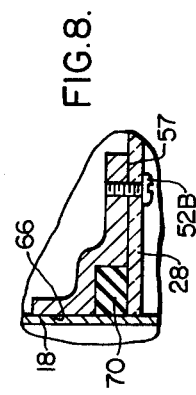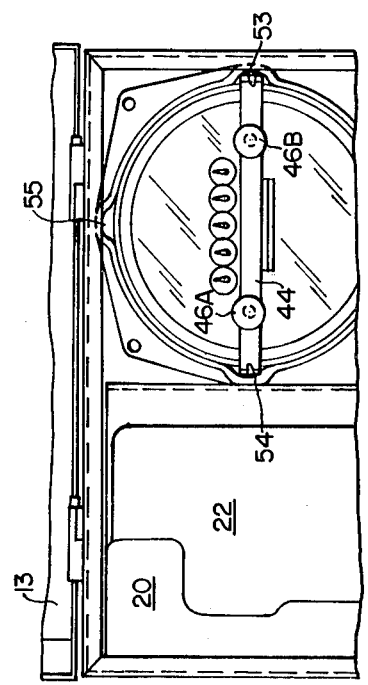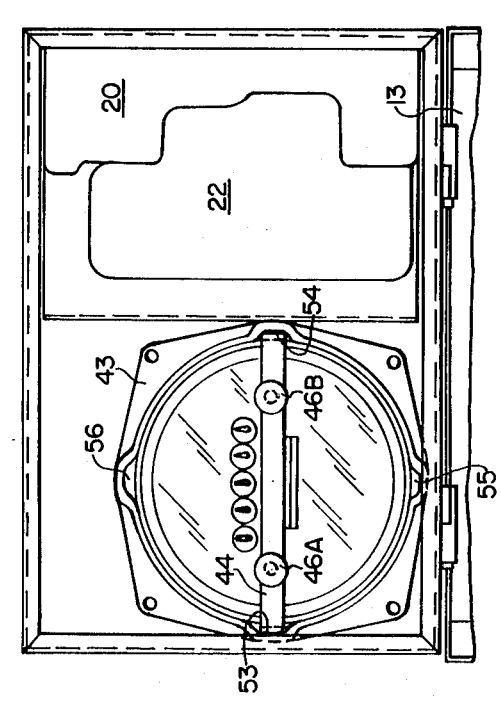

ELECTRIC LOAD RESEARCH DEVICE INCLUDING AN ENCLOSURE HAVING ADJUSTABLE METER POSITIONS

CROSS-REFERENCE TO RELATED APPLICATIONS AND PATENTS

This application is a Continuation Application of application Ser. No. 550,700, filed Feb. 18, 1975, now abandoned, and is related to U.S. Pat. No. 3,943,498 issued Mar. 9, 1976 to T. M. McClelland III.

BACKGROUND OF THE INVENTION

This invention relates to an improved electric load research device and more particularly to an electric load research device having an electric utility meter equipped with a pulse initiator and a recorder housed in an elongated enclosure wherein the meter is attachable in alternate predetermined positions so that the enclosure elongated axis can be oriented in different rotated positions relative to the meter.

Load research devices are used extensively by electric utility companies to study and record a customer's load and energy consumption characteristics. One general type of load research device, also referred to as a load survey recorder, includes a recorder and a watthour meter equipped with a pulse initiator or impulse sending device. The meter is of a type matching the customer's watthour billing meter and generates demand pulses which are recorded on one track of the recorder recording medium. The recorder simultaneously records time interval pulses correlated to real time. The meter of the load research device is connected into the customer's meter socket while it is integrally assembled in the load research device.

Prior art load research devices are described at pages 706-708 in the Electrical Meterman's Handbook, Seventh Edition, published by the Edison Electric Institute, N.Y., N.Y. Load survey recorder types DSL, DSLD, and DSLD-S are described which are available from the Westinghouse Electric Corporation, Meter Division, Raleigh, N.C. A further load survey device designated Load Survey Recorder Type WR-1C is of a similar general type as the aforementioned load survey recorders and is described in the instructional bulletin I.L. 42-566 dated May, 1972, which is also available from the aforementioned manufacturer's address.

The aforementioned load survey or research devices are satisfactory in many applications, however, it has been found that the prior devices are normally limited to a single meter which is replaced within a given device with some difficulty. Also, internal interconnections between the meter and external terminals limit the current capacity of such load survey devices. The devices often are not usable with ringless meter sockets without the use of special socket adapters.

The orientation and positioning of the prior devices are normally fixed and where a customer's socket is located adjacent a distribution panel, switches or other meters, for example, the sockets are sometimes not accessible for use of the prior load research devices. Also, it is necessary to deenergize the recorders and in some instances to remove the recorder from the enclosure of the survey unit to remove the recording tape cartridges. Also, the enclosures of the load research devices are sometimes not sufficiently sealed when mounted in certain customer meter locations so as to prevent their use in adverse atmospheres and weather conditions.

SUMMARY OF THE INVENTION

In accordance with the present invention, an electric load research device includes an elongated enclosure that carries a metering unit including a pulse initiating equipped electric utility meter in a first section of the enclosure and a data pulse recorder unit in a second section of the enclosure such that the meter and recorder are combined in a single load research device. The enclosure has a generally rectangularly shaped box with a hinged lid or door with the first and second sections disposed adjacently along an elongated axis of the enclosure. When the enclosure is oriented upright, with the elongated axis vertical, the first and upper section includes an adjustable meter mounting arrangement for attachment to a watthour meter cover of the metering unit insertable through a rear opening of the enclosure. The second and lower section includes a magnetic pulse data recorder having a removable tape cartridge accessible from the front of the enclosure through a door opening.

The adjustable meter mounting arrangement includes a U-shaped bar strap fastened to the front face of the meter cover with the strap opposing legs extending rearwardly to a mounting ring. The mounting ring surrounds the opening in the rear of the enclosure and sealingly engages the rearward periphery of the meter cover. The ring includes a series of recessed notches wherein different pairs of the notches receive the ends of the strap legs for orienting and rotationally locking the enclosure in one of four 99° spaced positions relative to the meter. The meter of the research device metering unit is insertable into a socket to replace the customer's billing watthour meter such that the elongated axis of the enclosure can extend in different directions when recording electrical energy demand pulses and time interval pulses.

It is a general feature of this invention to provide an electrical load research device having an enclosure with an adjustable meter mounting arrangement for releasably securing a meter in one of different rotational positions. Meters are easily exchanged in the enclosure so that the meter of the research device is of an identical type as used for the customer's billing meter. Various rotational positions of the enclosure are afforded relative to the customer's meter socket to facilitate installation of the load research device where obstructions may be immediately adjacent the customer's socket. A still further feature of this invention is to provide a research device having sealing engagement with a removably mounted metering unit and to provide weatherproof protection of a recorder unit, a metering unit, and associated elements housed in the device enclosure.

These and other features and advantages of the present invention will be apparent from the detail description of the drawings which are briefly described hereinafter.

BRIEF DESCRIPTION OF THE DRAWINGS

FIG. 3 is a front elevational view corresponding to the view in FIG. 1 with the enclosure illustrated in a different rotated position and extending in an inverted vertical orientation relative to an attached metering unit;

FIG. 4 is a further front elevational view corresponding to the view illustrated in FIG. 1 with the enclosure illustrated in a further different rotated position being horizontally oriented relative to the metering unit;

FIG. 5 is a still further front elevational view corresponding to the view of FIG. 1 with the enclosure illustrated in a fragmentary view in a still further rotated position being in an opposite horizontally oriented position from that shown in FIG. 4 relative to the metering unit;

FIG. 6 is a side elevational view taken along the axis VI—VI in FIG. 1 and looking in the direction of the arrows and illustrating an adjustable meter mounting arrangement;

FIG. 7 is a fragmentary front view of a portion of a meter cover front face illustrated in FIG. 1 including an internally threaded bushing insert; and FIG. 8 is an enlarged sectional view taken along the axis VIII—VIII in FIG. 1 and looking in the direction of the arrows.

DESCRIPTION OF THE PREFERRED EMBODIMENT

Figure 1:
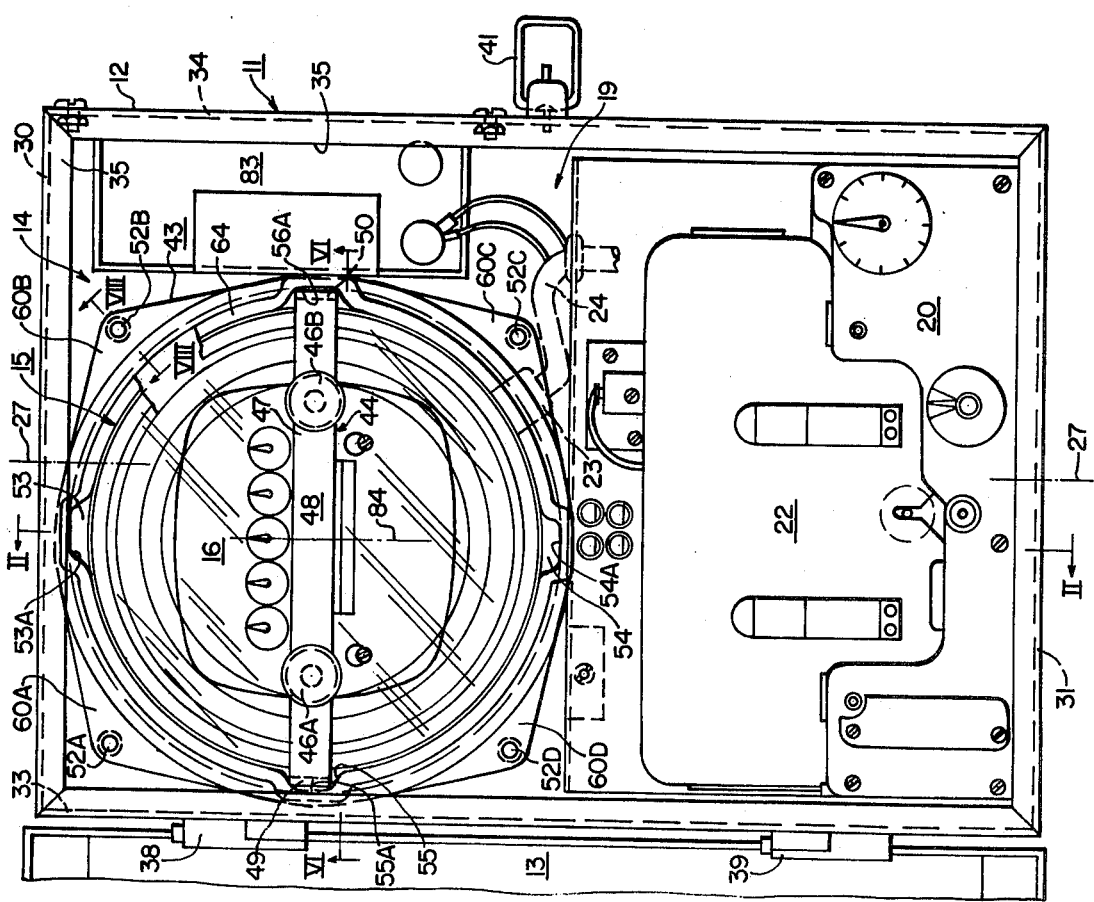
FIG. 1 is a front upright elevational view of an electric load research device made in accordance with the present invention and including an enclosure having a door shown in an opened position.

Referring now to the drawings and more particularly to FIG. 1 there is shown an electrical load research device 10 made in accordance with the present invention. The device 10 is housed in an elongated enclosure 11 preferably including two attached parts formed by a rectangular open box 12 and a hinged lid or door 13 both described in particular detail hereinbelow. A first section 14 of the enclosure receives a metering unit 15 including a watthour meter having an impulse sending device, not shown, formed by either a mechanical or photoelectric pulse initiator for producing pulses responsive to the metering rotation of the meter movement 16 having a dial register. The meter is an identical or corresponding load capacity type to that used for metering and billing a customer's load for which a load study analysis is desired. The watthour meter movement 16 is carried on the front of a base 17 and blade contact terminals 16A, connected to the meter movement, extend rearward from the base 17 in a known manner of watthour meters. The contact terminals 16A mount the metering unit 15 to a customer's meter socket in the conventional fixed, vertical operating position. A dial register of the meter movement 16 indicates the customer's kilowatt hour energy consumption as does the regular billing meter. Additionally, the metering unit 15 includes an impulse sender not normally included in a billing meter replaced by the metering unit 15. A meter cover 18 projects forward from the base 17 and is provided for cooperatively operating with present invention as also described further hereinbelow.

A second section 19 of the enclosure, below the first section as viewed in FIG. 1, includes a magnetic tape recorder unit 20 mounted to the enclosure box 12. The recorder unit 20 is a known type including a removable tape cartridge 22. A detachable plug 23 on a recorder cabling 24 connects through an opening in the meter cover 18 to a socket associated with the impulse sender. The impulses initiated in the metering unit 15 are applied to the recorder unit 20 and the recorder unit records both metering pulse data and time interval data on separate recording tracks of the recording medium of the magnetic tape cartridge 22. One arrangement contemplated for initiating and recording metering pulses as just described is disclosed in U.S. Pat. No. 3,943,498, issued Mar. 9, 1976 to T. M. McClelland III et al, and assigned to the assignee of this invention, which disclosure is incorporated herein by reference to fully describe one working embodiment. It is to be noted that the present invention is not limited for use with the arrangement as disclosed in the aforementioned application.

Referring now in more particular to the enclosure 11, a center elongated axis 27 of the enclosure extends vertically in FIG. 1. The enclosure box 12 includes a rectangular back wall 28, having a circular hole opening 29 shown in FIG. 2. Top and bottom walls 30 and 31, respectively, and left and right side walls 33 and 34, respectively, as viewed in FIG. 1, extend forward with right angle corners. The box 12 is formed integrally from a suitable sheet steel material. The front edges of the top and bottom walls 30 and 31 and the side walls 33 and 34 are turned inward at an angle of approximately 90° to form a narrow lip 35 defining the periphery of the front opening of the box 12 and providing an expanded surface to be overlapped by the door 13.

The door 13, partially shown in FIGS. 1, 2, 3, 4 and 5 is formed of an integral sheet steel material of the type also forming the enclosure box 12. The door has a substantially flat rectangular configuration with the four edges of the door turned rearwardly at right angles so as to form an overlapping relationship with the top, bottom and sides of the enclosure box 12. The left side of the door is attached to the left sidewall 33 by a pair of hinges 38 and 39. A latch 41 on the right sidewall engages the free-swinging edge of the door 13 to hold it in a closed relationship to cover the front opening of the box 12. The door includes an optional transparent window 13A, shown in the sectional view of FIG. 2, aligned with the dial register of the meter movement 16 so that the dial register may be observed without opening the door 13. With the door 13 closed, the front of the enclosure 10 is substantially water and dust-tight.

An adjustable meter mounting arrangement forming an important feature of this invention includes a mounting ring 43 carried on the back wall 28, a bracket assembly 44, and a portion of the meter cover front face including bushing inserts 45A and 45B. Screw fasteners 46A and 46B included in the bracket assembly 44 and the inserts 45A and 45B, which are internally threaded, form a releasable fastening means clamping the mounting arrangement together. The bracket assembly 44 includes a U-shaped bar strap 47 formed from a cold rolled steel flat bar stock material. As shown in FIG. 6, the bar strap 47 includes a straight bottom front portion 48 and opposing legs 49 and 50 defining integral rear portions extending at approximately ninety degrees from the ends of the bottom portion 48. Two holes 51A and 51B are provided substantially equidistant from the ends in the bottom portion 48 for receiving the screws 46A and 46B. The bottom portion 48 is fastened to the front face of the watthour meter cover 18 as described further hereinbelow.

Figure 2:
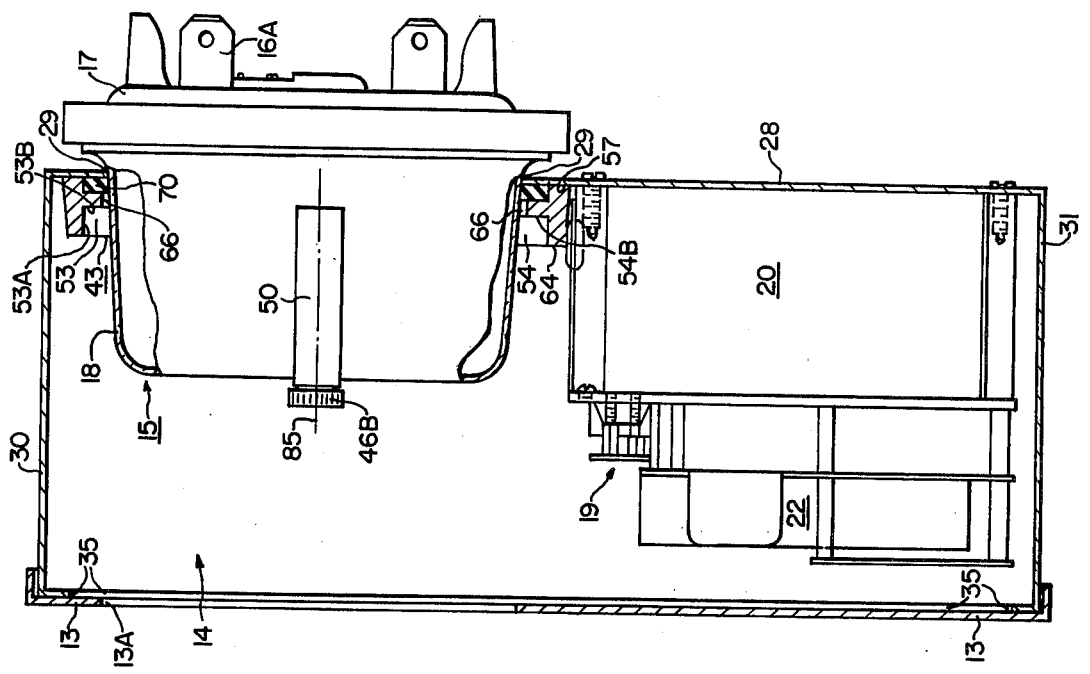
FIG. 2 is a side sectional view taken along the axis II—II in FIG. 1 and looking in the direction of the arrow with parts removed and with the door illustrated in a closed position.

The mounting ring 43 is fastened by the screws 52A, 52B, 52C and 52D to the back wall 28. Pairs of diametrically opposite recessed notches 53 and 54 and 55 and 56 are included in the forward portion of the mounting ring 43 to receive the terminal ends of the strap legs 49 and 50 so as to secure the enclosure 11 to the meter as also described in detail hereinbelow. The mounting ring 43 includes a flat annular back portion 57 shown in the cross-sectional views of FIGS. 2, 6 and 8. The general front outline of the mounting ring 43 is defined by four equally substantially arcuate sides defining radial flange portions 60A, 60B, 60C and 60D. The flanges receive the screws 52A, 52B, 52C and 52D mounted from the rear of the back wall 28 to permanently attach the mounting ring 43 to the interior side of the back wall 28, as shown in FIG. 8, surrounding the circular opening 29. A forward extending portion 64 of the mounting ring 43 includes a slightly inwardly tapered circular support wall 66, having a conical-section wall surface adapted to conform to and support rearward portion of the tapered circular side of the watthour meter cover 18, as shown in FIGS. 2, 6 and 8. A right-angled circular recess 68 extends around the rear radially inward portion of the back 57 at the corner of the wall 66 of the mounting ring 43 for receiving an elastomeric gasket or ring seal 70. The ring seal 70 is held in place within the circular recess 68 and against the inner side of the back wall 28 to form a moisture and dust-tight seal between the watthour meter cover 18 and the back of the enclosure around the opening 29.

The notches 53, 54, 55, and 56 are each formed by a generally three-sided offset portion from the support wall 66 in which the four, three-sided portions are formed generally U-shaped and radially outward of the cover engaging wall portion as viewed in FIG. 1. Thus, the notches have inner forward projecting sides designated 53A, 54A, 55A and 56A in FIG. 1, also shown in the side sectional views of FIGS. 2 and 6, extending around the radially outer extent of a flat horizontal rear and bottom part of the notches designated 53B, 54B, 55B and 55C as viewed in FIGS. 2 and 6. Each notch is complementary shaped to receive the rectangular ends of one of the bracket legs 49 or 50. Accordingly, the notches surround the top, bottom and radially outward sides of the ends of the legs 49 and 50 forming a rotational locking means to prevent turning therein. The terminating end surface of the legs are pressed against the radial bottom part of the notches as shown in FIG. 6 when the front portion 48 of the bracket strap 47 is secured to the front face of the meter cover as described hereinafter.

The manner of attaching the bracket bar 47 to the front face of the meter cover 18 is best illustrated in FIG. 6. The meter cover is preferably made of a plastic composition and is the same cover as disclosed and claimed in U.S. Pat. No. 3,846,677 issued Nov. 5, 1974, and assigned to the assignee of this invention, except with the addition of the inserts 45A and 45B. The strap 47 is attached to the front face of the watthour meter cover by means of the screws 46A and 46B which are threadably received by the inserts 45A and 45B integral with the front face of the watthour meter cover as shown in FIG. 6. The screws 46A and 46B include externally threaded end portions 74A and 74B, reduced shank portions 75A and 75B and knurled edge head portions 76A and 76B. The shank portions freely extend through the holes 51A and 51B in the strap 47. The hole openings 51A and 51B have a slightly larger diameter than the shanks of the screws 46A and 46B and a slightly smaller diameter than the diameter of the threaded portions to prevent the screws from being removed axially from the bracket front portion 48. In the preferred embodiment, the holes 51A and 51B are internally threaded so that the threaded portions of the screws 46A and 46B may be threadably applied through the hole openings 51A and 51B. The screw head portions 76A and 76B are enlarged for manually turning and threading the screw portions into and out of the inserts 45A and 45B.

The bushing inserts 45A and 45B are shown in FIGS. 6 and 7 as they are permanently fixed to the closed end face of the watthour meter cover 18 by being force-fitted into circular openings 77A and 77B in the cover face. The inner side of the inserts have radially outward extending flange portions 78A and 78B which are clamped against the inner side of the cover 18 when the screws 46A and 46B are threaded into the insert body parts 79A and 79B including internally threaded portions 80A and 80B. The body parts 79A and 79B are slightly longer than the thickness of the cover so as to terminate forward of the face of the watthour meter cover to engage the strap front portion 48. The outer periphery of the body of the inserts may be knurled to facilitate a gripping force-fit of the inserts, which are applied from the inside of the cover and through the cover openings 77A and 77B, and to prevent turning of the inserts when the screws 46A and 46B are applied thereto.

When the strap 47 of the bracket assembly 44 is aligned with the inserts 45A and 45B, the screws 46A and 46B are threaded into the inserts to clamp the strap 47 to the front face of the watthour meter cover 18. The ends of the legs 49 and 50 are then forced against the bottom of the notches. This pulls the watthour meter cover 18 forward and into tight sealing engagement with the ring seal 70 around the edges of the enclosure back opening 29.

As illustrated in FIG. 1, the enclosure 11 further includes a battery 83 in an area laterally adjacent the metering unit 15 and is mounted against the right sidewall 34. The battery 83 is optionally included for recorders having a battery carry-over feature as disclosed in U.S. Pat. No. 3,538,406 issued Feb. 20, 1967 and assigned to the assignee of this invention, or for recorders as disclosed in the aforementioned U.S. Pat. No. 3,943,498.

In a typical operation of the present invention, a customer's location is selected, such as a residential or apartment dwelling, for a desired load study analysis by an electric utility company. A watthour metering unit 15 is selected so that the watthour meter movement corresponds to the customer's billing watthour meter. If not already installed, the metering unit 15 is inserted through the hole opening 29 of the back wall 28 of the enclosure box 12 and then the enclosure is rotationally oriented so that it will be free of interference of any obstructions such as adjacent meters or panel boards or other obstructions. Any of the four quadrantal arc spaced positions are available.

By example and not limitation the dimensions of one working embodiment includes the overall sidewall length or height of the box is approximately 35 centimeters (13.75 inches), the overall width dimension is approximately 24.4 centimeters (9.6 inches) with approximately 26.9 centimeters (10.6 inches) with the door in a 90° open position. The mounting arrangement of the enclosure is oriented so that there is approximately 9.65 centimeters (3.8 inches) between the vertical center line 83 of the meter and the hinged sidewall 33 of the enclosure as viewed in FIG. 1. The axial center of the meter extends approximately 9.4 centimeters (3.7 inches) from the top of the enclosure. These dimensions provide a significant advantage in the preferred embodiment of this invention just described since it permits mounting of the load research device 10 in locations which heretofore have been extremely difficult or not possible.

Accordingly, the enclosure 11 may be rotated relative to the metering unit 15 in one of four positions in different quadrants as shown in FIGS. 1, 3, 4 and 5. In the vertically inverted position shown in FIG. 3, the recorder unit 20 is above the metering unit 15 with the bracket assembly strap legs 49 and 50 reversed in the notches 55 and 56 from that shown in FIG. 1. In practice, the strap 47 is symmetrical about the center so that the bracket may be turned around to reverse the position of the legs 49 and 50 if more convenient for mounting of the meter to the enclosure. Accordingly, in FIGS. 4 and 5 the recorder unit 20 is oriented substantially horizontally with respect to the metering unit 15 with the strap legs 49 and 50 in the notches 53 and 54 permitting the recorder unit 20 to be oriented horizontally to the right in which case the door 13 is at the bottom of the enclosure 11, or to the left of the metering unit as shown in FIG. 5 with the door at the top of the enclosure.

In accordance with the present invention, there is no limitation upon the current capacity or load which may be monitored by the load research device 10 since there is no internal wiring or conductors which must carry the load current. The metering unit 15 may be exchanged for metering units corresponding to the customer's billing meter and the metering unit is inserted into the customer's socket directly. The orientation of the load research device 10 may be varied to accommodate different meter installations. In one particular example, the load research device 10, as described hereinabove can be mounted at a load distribution center having a number of ranged meters or adjacently mounted meters when the meters are at least 25.4 centimeters (10 inches) from center to center. In another embodiment of the device 10, meters 20.3 centimeters (8 inches) can be accommodated.

The load research device 10 is further usable with either single phase or polyphase meters which are provided with a cover 18 having the plug opening and bushing inserts 45A and 45B for removably attaching the enclosure 11 to the desired metering unit 15. The door access feature enables the recorder tape cartridge 22 to be inserted and removed without any other changes in the mounting or connections of the device. Since the enclosure configuration is substantially dustproof and weather-resistant, it may be utilized in outdoor and other adverse environments.

While a preferred embodiment of the present invention is described hereinabove, it is apparent to those skilled in the art that other modifications and changes may be made without departing from the spirit and scope of this invention.

I claim:

1. An electric load research device for installation at an electric billing meter socket in different orientations, said device comprising:
    an enclosure formed by a box member including a wall defining an opening for receiving a forward projecting cup-shaped cover of a metering unit mountable in the meter socket;
    a mounting means carried on the inner side of said wall around said opening, said mounting means including a support surface for supporting engagement with the metering unit cover when said box member is oriented in different rotated positions about the cover;
    a bracket assembly including front and rear portions, said front portion being attachable to said cover when the cover is engaged by said support surface,
    locking means carried by said box member and receiving different rotated positions of said rear portion of said bracket assembly for preventing relative rotation between said box member and said cover;
    and releasable fastening means for clamping said bracket assembly to said cover and said locking means so that said enclosure is fixedly carried by said cover of said metering unit in one of preselected rotated orientations.

2. An enclosure as claimed in claim 1 wherein said bracket assembly includes a U-shaped strap member so that rear portion includes the free ends of two opposite leg parts thereof and said front portion includes the bottom part thereof extending across the front face of the metering unit cover, and further wherein said locking means includes a plurality of recessed notches arcuately spaced in diametrically opposite pairs of the notches for receiving said free ends of said strap member.

3. An enclosure as claimed in claim 2 wherein said plurality of recessed notches includes at least four recessed notches equally circumferentially spaced at 90° apart to define two of opposite pairs of notches for orienting the enclosure in one of four 90° rotated positions relative to the metering unit.

4. An enclosure as claimed in claim 1 wherein said support surface includes an annular recess, and wherein the mounting ring further includes an elastomeric ring seal carried in said annular recess for sealing engagement with the metering unit cover.

* * * * *